United States Patent
Kitazawa

(10) Patent No.: US 7,347,377 B2
(45) Date of Patent: Mar. 25, 2008

(54) CARD READER AND ABNORMALITY COPING METHOD FOR CARD READER

(75) Inventor: Yasuhiro Kitazawa, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 182 days.

(21) Appl. No.: 11/291,654

(22) Filed: Nov. 30, 2005

(65) Prior Publication Data
US 2006/0138241 A1   Jun. 29, 2006

(30) Foreign Application Priority Data
Nov. 30, 2004   (JP) ............... 2004-347345

(51) Int. Cl.
*G06K 13/00*   (2006.01)
(52) U.S. Cl. .............. 235/475; 235/380; 235/435
(58) Field of Classification Search ........ 235/475, 235/439, 380, 451, 479, 449, 435
See application file for complete search history.

(56) References Cited

U.S. PATENT DOCUMENTS

| | | | | |
|---|---|---|---|---|
| 7,100,829 B2* | 9/2006 | Okada | .......... | 235/439 |
| 7,175,085 B2* | 2/2007 | Oguchi | .......... | 235/451 |
| 2002/0117550 A1* | 8/2002 | Hirasawa | ...... | 235/479 |
| 2005/0116036 A1* | 6/2005 | Akahane et al. | .... | 235/449 |
| 2006/0118623 A1* | 6/2006 | Kitazawa | ...... | 235/436 |
| 2007/0080225 A1* | 4/2007 | Hirasawa et al. | .... | 235/449 |
| 2007/0162187 A1* | 7/2007 | Ishiguro et al. | .... | 700/275 |

OTHER PUBLICATIONS

Patent Abstracts of Japan, Publication No. 11-039434 / published on Feb. 12, 1999 "Collect Card Carrier Device for Card Reader/Writer" Nippon Conlux Co Ltd (Appln No. 09-189853 / Jul. 15, 1997).
Patent Abstracts of Japan, Publication No. 2001-222686 / published on Aug. 17, 2001 "Card Reader" Sankyo Seiki Mfg Co Ltd (Appln No. 2000-031726 / Feb. 9, 2000).

* cited by examiner

*Primary Examiner*—Thien M. Le
*Assistant Examiner*—Edwyn Labaze
(74) *Attorney, Agent, or Firm*—Reed Smith LLP

(57) ABSTRACT

A card reader includes a shutter provided at a card insertion port, a shutter opening and closing detection device for detecting the shutter being opened and a control device for taking the card shaped medium into the inside of the card reader. In a waiting state where the shutter is closed and a card shaped medium is not present in the inside of the card reader and further, when the shutter opening and closing detection device detects opening of the shutter without detecting insertion of a card shaped medium from the card insertion port, the control device decides occurrence of abnormality to perform abnormality coping processing.

5 Claims, 3 Drawing Sheets

CARD READER AND ABNORMALITY COPING METHOD FOR CARD READER

CROSS-REFERENCE TO RELATED APPLICATION

This application claims priority to Japanese Application No. 2004-347345 filed Nov. 30, 2004, which is incorporated herein by reference.

BACKGROUND OF THE INVENTION a) Field of the Invention

The present invention relates to a card reader which performs processing on the basis of card information that is recorded on a card-shaped recording medium (hereinafter, referred to as a card shaped medium) such as a credit card. More specifically, the present invention relates to a card reader and an abnormality coping method for a card reader which are provided with a function preventing illegal theft of a card shaped medium.

b) Description of the Related Art

In general, a card reader equipped in an ATM device (automatic teller machine) or a vending machine is a device for executing card transactions in which information recorded in a magnetic recording area of a card shaped medium that is inserted from a card insertion port is performed with reading or writing processing. In the card reader, when the card shaped medium inserted from the card insertion port is detected to be a regular card, a shutter is opened and the card shaped medium is taken into the inside of the shutter. After having been taken into the inside, the shutter is closed. At the time the card shaped medium is taken in, when the shutter is opened, a motor as a drive source is activated and a card feeding system is operated. Then, the card shaped medium is taken on a feeding belt and carried to a magnetic head for executing reading or writing card information while detecting the position with a card detecting sensor to execute card transactions. Normally, a shutter performs the following protection functions. For example, when the card shaped medium is jammed on the way in the feeding path, the shutter closes the card insertion port to prevent a malicious third person from pulling out the jammed card shaped medium for illegal theft (see, for example, Japanese Patent Laid-Open No. 2001-222686). Alternatively, the shutter prevents the card feeding system from being damaged by a bar-shaped foreign object of mischief which is inserted from the card insertion port (see, for example, Japanese Patent Laid-Open No. Hei 11-39434).

The following structure has been well-known as a conventional card reader provided with a protection function for preventing a card illegal theft. For example, a customer forgets to take out the card which is returned to the card insertion port after a card transaction has been finished and the card is left without taking out. In this case, the next customer cannot execute a card transaction or an illegal person may take out the forgotten card for theft. In order to prevent such difficulties, when the leaving state of a card due to forgetting the card is continued for a specified period of time, the card which is left is collected in a card collection container which is arranged in the card reader device and the shutter is closed after the card which is left is collected and, after that, a waiting state is continued until the next card transaction is executed.

The foreign object inserted from the card insertion port may be a trap which is set to steal a card that is jammed on the way along the feeding path or a card in the card collection container in addition to a bar-shaped object of mischief. For example, a trap is inserted with a card at the time of card insertion by an illegal person pretending card transactions, or alternatively, the closed shutter in the waiting state is forcibly opened to set a trap. When the trap which is set is a hard object, the shutter is supported by the trap and is not completely closed, and thus the occurrence of abnormality is detected. However, when the trap is a soft and thin sheet shaped object, the shutter can be closed through the sheet-shaped trap and thus abnormality in which the trap has been set cannot be detected. As a result, a card shaped medium which is taken into the device for subsequent card transactions or a collected card in the card collection container may be allowed to be stolen with the trap.

In the latter prior art described above, the shutter has continued to be open even though the card shaped medium inserted from the card insertion port is taken into the inside of the device, a control system of the card reader judges that abnormality occurs on the basis of a suspicion that a trap may be set at the time of insertion of the card. Therefore, the control system of the card reader sends a warning notice of the occurrence of abnormality to a host device and waits an instruction from the host device.

However, the conventional card reader described above enters into a waiting state until an instruction is sent from the host device after the occurrence of abnormality caused by the setting of the trap has been notified to the host device and the card reader itself does not cope with the abnormality. As a result, an illegal person can take out the card during the waiting state.

OBJECTS AND SUMMARY OF THE INVENTION

In view of the above-mentioned problems, it is an object and advantage of the present invention to provide a card reader and an abnormality coping method for a card reader which are capable of previously preventing illegal theft of a card or the like at the time of the occurrence of abnormality.

In order to achieve the above object and advantage, according to an embodiment of the present invention, there is provided a card reader and an abnormality coping method for a card reader including a shutter which is provided at a card insertion port so as to be capable of opening and closing for permitting taking-in of a card shaped medium into an inside of the card reader, a shutter opening and closing detection means for detecting the shutter being opened, and a control means for taking the card shaped medium into the inside of the card reader to perform a prescribed processing when the card shaped medium is normal. In this card reader, the control means judges the occurrence of abnormality to perform abnormality coping processing when the shutter opening and closing detection means detects opening of the shutter without detecting insertion of a card shaped medium from the card insertion port in a waiting state where the shutter is closed and a card shaped medium is not present in the inside of the card reader.

Therefore, in this embodiment, the waiting state is a state in which a card shaped medium is not inserted from the card insertion port and not present in the inside of the card reader and the shutter is closed. In this waiting state, when the shutter opening and closing detection means detects opening of the shutter without detecting insertion of a card shaped medium from the card insertion port, the control means judges the occurrence of abnormality and copes with the abnormality by itself without waiting an instruction from its host device or the like.

Further, in accordance with an embodiment, the control means includes an abnormality judging part which compares an actual measuring detection time "t" that is measured when opening of the shutter is detected by the shutter opening and closing detection means with a specified detection time "T" which is set previously to judge the occurrence of abnormality when the actual measuring detection time "t" exceeds the specified detection time "T", and an abnormality coping part for coping with the abnormality by an instruction from the abnormality judging part.

Therefore, in this embodiment, when a shutter is opened at the waiting state, the detection time period detected by the shutter opening and closing detection means is measured. When the actual measuring detection time "t" is longer than the specified detection time "T" which is set previously, in other words, when the shutter has been unusually opened, the abnormality judging part decides that an abnormality occurs due to a fraudulent conduct or the like and sends an instruction to the abnormality coping part to cope with the abnormality. In this case, when the shutter has been unusually opened without newly detecting insertion of a card shaped medium from the card insertion port, the abnormality judging part judges it as an abnormality where the shutter is forcibly opened in order that an illegal person sets a trap, and thus the abnormality coping part is operated to prevent a further fraudulent conduct of thieving a card by an illegal person and informs the occurrence of abnormality to the surroundings.

Further, in accordance with an embodiment, the abnormality coping part includes at least one of a display part which displays an abnormality message on its screen, an alarm part which notify the abnormality, and a shutter emergency closing part which urgently closes the shutter.

Therefore, in this embodiment, for example, when a display image is provided on a body of a card reader as a display part, the abnormality coping part which is instructed so as to cope with the abnormality by the abnormality judging part displays a message of the occurrence of abnormality on the screen to call attention to the surroundings. For an illegal person, its fraudulent conduct has been recognized to consider to cease the fraudulent conduct. Further, for example, when an alarm part that sounds a buzzer is provided in the card reader, the alarm part is sounded to warn the surroundings to prohibit the fraudulent conduct. Further, for example, when a shutter emergency closing part is provided in the card reader, an emergency activating signal is transmitted to its drive system and the shutter is urgently closed to prohibit the fraudulent conduct. As described above, the abnormality coping part may be constructed by using one of the display part, the alarm part and the shutter emergency closing part. However, the abnormality coping part may be constructed by appropriately combining them.

As described above, in accordance with an embodiment, in a normal waiting state, when the shutter is opened without newly detecting insertion of a card shaped medium from the card insertion port, control means immediately decides the occurrence of abnormality and copes with the abnormality by itself without waiting an instruction from its host device and thus it is effective to act in advance to prevent theft of a card by fraudulent conduct.

Further, in accordance with an embodiment, the control means detects how long the shutter is opened, in other words, whether the actual measuring detection time "t" exceeds the specified detection time "T" or not. When the shutter continues to be opened over the specified detection time "T", the abnormality judging part decides it as the occurrence of abnormality and sends an instruction to the abnormality coping part to prevent the fraudulent conduct such as setting of a trap by an illegal person and thus it is effective to act in advance to prevent theft of a card by fraudulent conduct.

Further, in accordance with an embodiment, at least one of the display part, the alarm park, and the shutter emergency closing part is operated to call attention to the surroundings and a further fraudulent conduct of theft of a card by an illegal person can be prevented.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

An embodiment of the present invention will be described in detail below with reference to the accompanying drawings.

Figure 1:
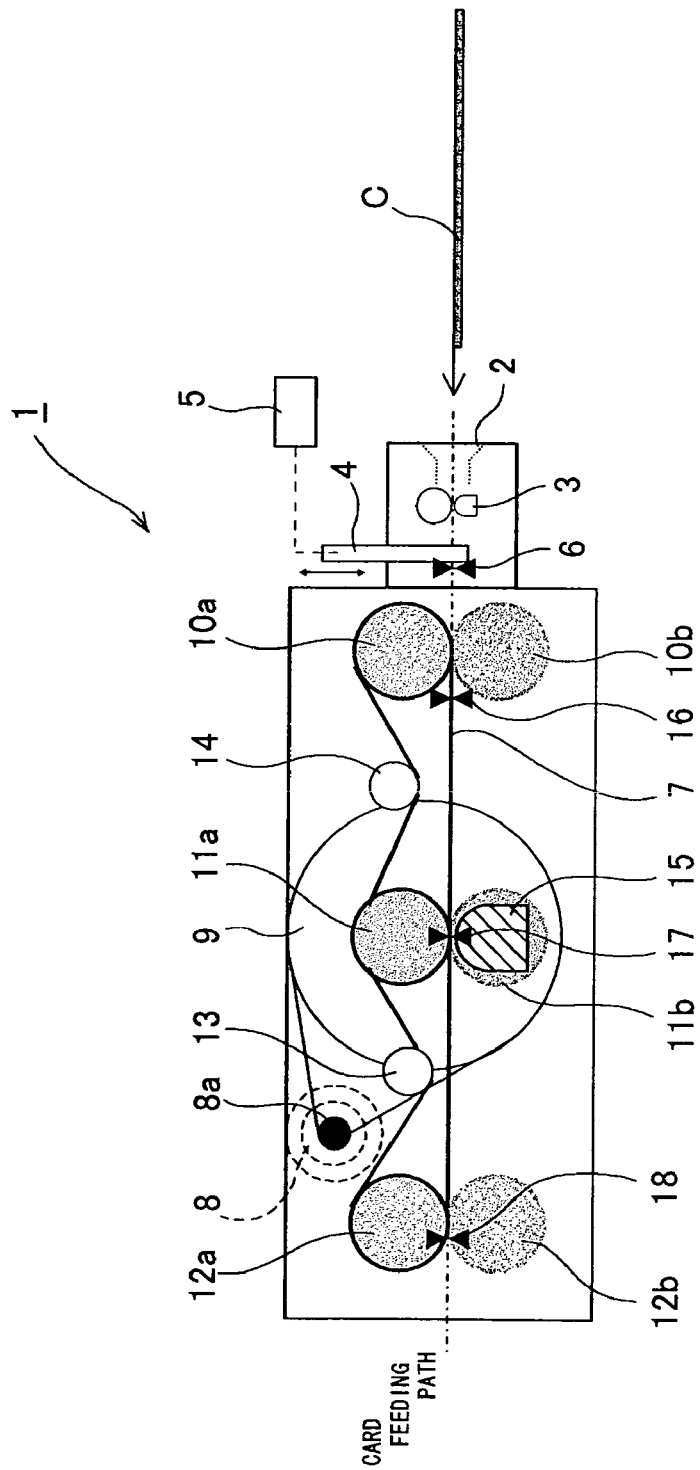
FIG. 1 is a schematic side view showing a card reader in accordance with an embodiment of the present invention.
Figure 2:
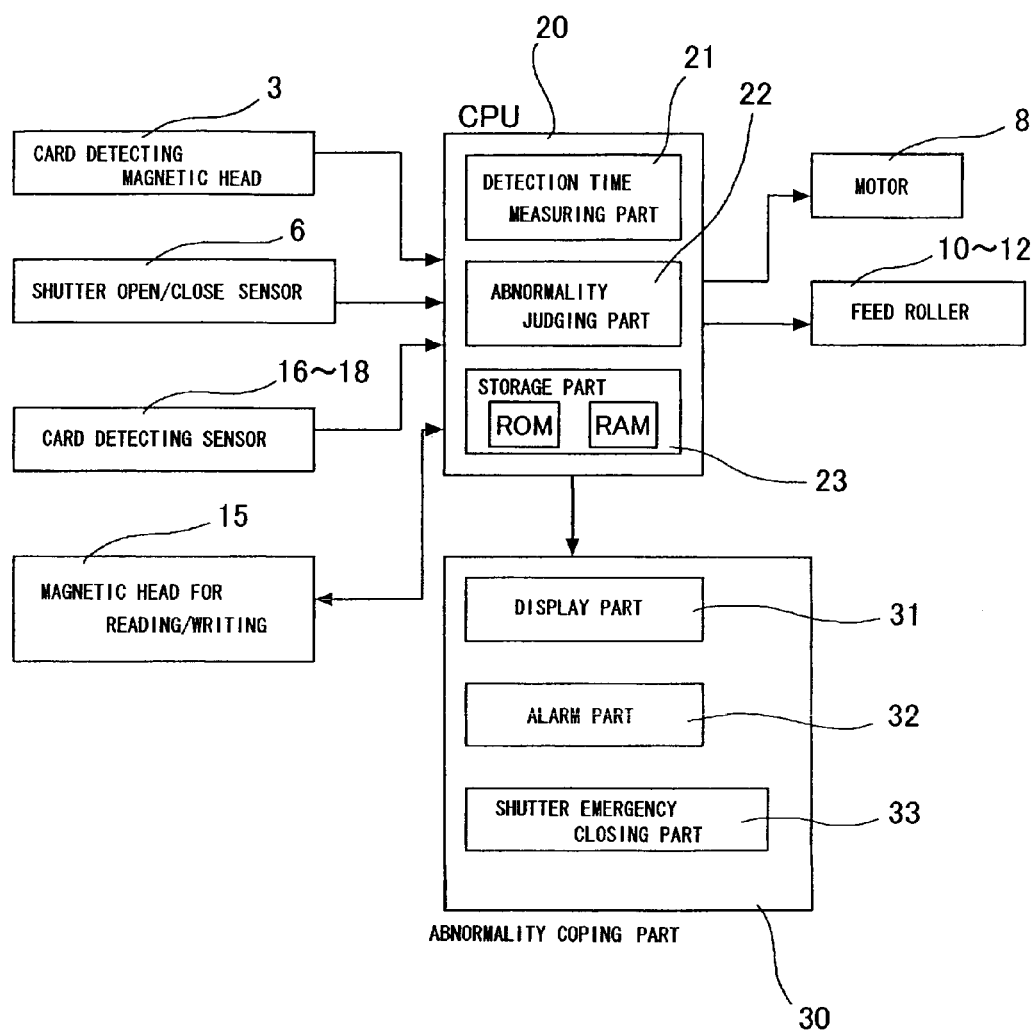
FIG. 2 is a functional block diagram showing a structure in accordance with an embodiment of the present invention.
Figure 3:
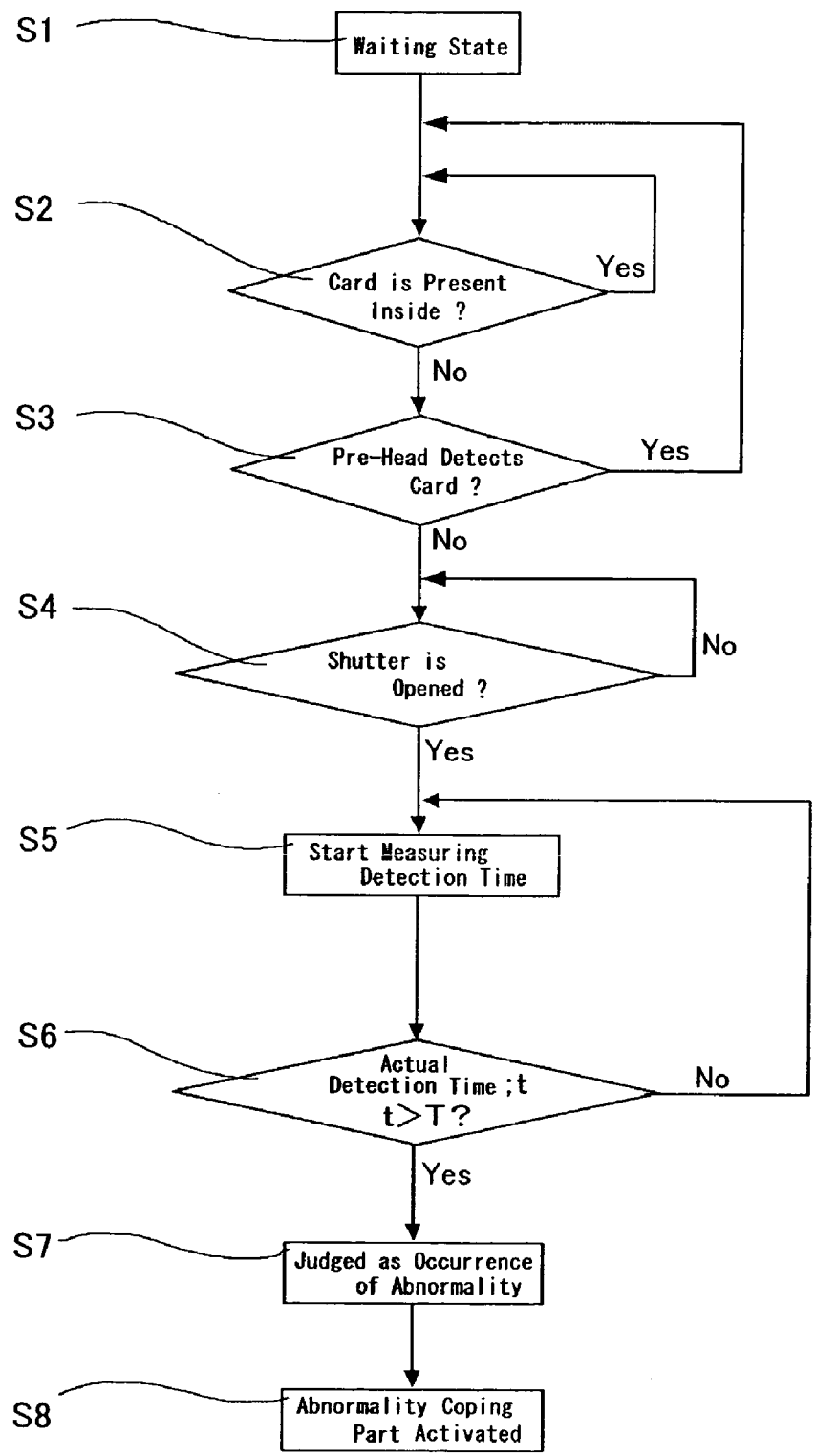
FIG. 3 is a flow chart of operations showing processes at the time of the occurrence of abnormality in accordance with an embodiment of the present invention.

A card reader and an abnormality coping method for a card reader in accordance with an embodiment are shown in FIG. 1 through FIG. 3. The card reader is provided with a card insertion port 2, into which a customer inserts a card shaped medium "C" such as a credit card, at the front part of a housing in a main body 1. On a card feeding path which extends from the card insertion port 2 to the inside of the main body, a card detecting magnetic head 3 is disposed at a position so as to face a pad roller in an up/down direction and such that a magnetic stripe as a recording part is capable of being detected when the inserted card shaped medium C is a magnetic card. Further, a shutter 4 is also disposed such that, when the card shaped medium "C" is judged to be not a normal card but an illegal card from detection result by the card detecting magnetic head 3, the shutter 4 is kept in a closed state to prevent further taking-in of the card to the inside of the card reader. When the inserted card shaped medium "C" is a normal card, its detection causes the shutter 4 to open and the passing of the normal card shaped medium "C" is permitted. Further, a solenoid 5 is disposed as a drive source that causes the shutter 4 to perform opening and closing operation at an ordinary time. The solenoid 5 is arranged to be operated as an emergency shutter closing part in the present invention which causes the shutter 4 to urgently close at an abnormal time as well as a normal time.

A feeding belt 7 is disposed along the card feeding path in the inside of the card reader which is located inside of the shutter 4 and a motor 8 is disposed which is a card feeding drive source that causes the feeding belt 7 to travel in a card feeding direction. Further, in order to decelerate the rotation which is outputted from the output shaft 8a of the motor 8 to a rotational setting speed and transmit to the feeding belt 7, card feeding members are disposed which is comprised of a decelerating device, a pulley 9, driving rollers 10a, 11a, 12a of feeding rollers 10 through 12 and tension rollers 13, 14 for adjustment of belt tension and the like. The notational symbols 10b, 11b, 12b in the drawing show driven rollers paired with the driving rollers 10a, 11a, 12a. A magnetic head 15 is disposed at a position of the transporting roller 11 for reading and writing card information from and on the magnetic recording area (magnetic stripe) which is recorded in the card shaped medium "C".

Following detection means is disposed in the card feeding path to detect the operations of the respective members of the card feeding system.

A shutter open/close sensor 6 such as an optical photo coupler is disposed near the shutter 4 for detecting whether the shutter 4 is opened or closed. Further, card detecting sensors 16, 17, 18 are disposed at positions corresponding to the transporting rollers 10 through 12 for detecting the presence of a card based on, for example, whether the card shaped medium "C" passes through the respective rollers or not. A photo sensor comprised of diodes of a light emitting element and a light receiving element may be used as these card detecting sensors 16 through 18 or a switch means such as a micro-switch may be used. Further, in addition to the card detecting sensors 16 through 18, a collected card detecting sensor (not shown in the drawing) is disposed as a card detection means for detecting the presence of a card shaped medium "C" which is collected in a card collection container (not shown in the drawing) arranged in the inside of the main body 1 of the card reader. A motor rotating speed detection means (not shown in the drawing) such as an encoder is coaxially disposed on the output shaft 8a of the motor 8 as a means for detecting the motor rotating speed. However, the present invention is not limited to the number of the feed rollers and the card detecting sensors as described above.

A CPU 20 (Central Processing Unit) which is an essential portion of a control means in the present invention is provided for controlling the entire card reader including the respective members and the sensors of the card feeding system. The CPU 20 comprises a detection time measuring part 21 and an abnormality judging part 22 which are included in a control part and an operation part. The CPU 20 sends reading and writing information and data to a ROM and a RAM which are storage parts and reads information and data to execute operation processing, and activating signals and command signals are inputted and outputted from the I/O port of an input and output part to required members in a transmittable and receivable manner. For example, a detection signal from the card detecting magnetic head 3 which is disposed near the card insertion port 2 is transmitted to the CPU 20 and the CPU 20 judges that the card is a normal card or an illegal card. Alternatively, since the distances between the respective sensors are set to be the same or nearly the same dimension of the card length of a card shaped medium "C", the CPU 20 receives the detection signals from the card detection sensors 16 through 18 to detect the time period between the detection of the front end part of the card and that of the rear end part of the card. The CPU 20 is capable of calculating the card length of the card shaped medium "C" in the operation part and judging whether the card is a normal card or an illegal card.

The detection time measuring part 21 counts actual detection measuring time "t" of how long the shutter open/close sensor 6 continues to detect opening, i.e., how long the shutter 4 is opened from the time when the shutter open/close sensor 6 detects the open of the shutter 4. The detection time measuring part 21 transits and notifies the actual measuring detection time "t" to the abnormality judging part 22. The abnormality judging part 22 compares the actual measuring detection time "t" transmitted from the detection time measuring part 21 with a specified detection time "T" which is previously set and stored in the ROM to check whether the actual measuring detection time "t" exceeds the specified detection time "T" or not. When the actual measuring detection time "t" exceeds the specified detection time "T", which means that the shutter 4 continues to be opened for an abnormally long time, the CPU 20 is programmed to decide that an abnormality condition occurs and to transmit a signal of operational instruction for executing proper reaction to an abnormality coping part 30.

The abnormality coping part 30 which receives an instruction from the abnormality judging part 22 of the CPU 20 may be constructed by using one or a combination of a display part 31, an alarm part 32 and a shutter emergency closing part 33.

The display part 31 may be provided by using, for example, an LCD (Liquid Crystal Display) at an appropriate position of the main body 1 of the card reader or a body of an ATM device to which the main body 1 of the card reader is integrated. The occurrence of abnormality in the main body 1 of the card reader is displayed with a character message and the like based on an operational instruction signal which is instructed from the abnormality judging part 22 of the CPU 20. When the card reader is connected to be capable of transmitting and receiving to and from a host device such as a host computer, the display part 31 may be provided on the host device such that a monitor screen or a display screen of the host device displays and notifies the occurrence of the abnormality.

The alarm part 32 may be mounted on either of the main body 1 of the card reader, the ATM device and the host device. The alarm part 32 may be constructed so as to alarm the occurrence of abnormality based on an instruction signal from the abnormality judging part 22 of the CPU 20 by sounding an alarm buzzer or repeatedly turning an LED lamp on and off.

The solenoid 5 for opening and closing the shutter described above may be utilized as the shutter emergency closing part 33. The solenoid 5 for normal operation is provided with a function which urgently moves the shutter 4 down to close when an emergency activating signal is transmitted from the abnormality judging part 22 of the CPU 20.

Next, operation of the above-mentioned card reader will be described.

At the time of normal operation of a card reader for an ATM device, when a customer inserts a magnetic card type of card shaped medium "C" such as a credit card or a prepaid card from the card insertion port 2, a magnetic stripe of the card shaped medium "C" is detected by the card detecting magnetic head 3. When the card shaped medium "C" is judged to be a normal card by the detection of the magnetic stripe, the CPU 20 activates the solenoid 5 based on the detection signal to open the shutter 4. When the shutter is opened, the card shaped medium "C" is further pushed into the inside of the device by manual operation of the customer and the motor 8 is activated. The rotation of the motor 8 is transmitted to the pulley 9 and the feeding belt 7 through the output shaft 8a to rotate the feed rollers 10 through 12 in a forward rotating direction and the card shaped medium "C" is carried to the position of the magnetic head 15 for reading or writing card information. After the card transaction based on the card information of the card shaped medium "C" has been finished, the card shaped medium "C" is carried in a backward direction and returned to a customer from the card insertion port 2.

The returned card shaped medium "C" may happen to be left due to forgetting of taking out the medium by a customer at the card insertion port 2. In this case, the next customer cannot execute a card transaction and further, the card may be stolen by a malicious third person. In order to prevent such a situation, when the forgotten card is left for a some time period without being taken out, it maybe constructed that the card shaped medium "C" is carried in the forward direction and collected in a card collection container provided in the inner side of the main body 1 of the card reader.

Further, the card shaped medium "C" may be jammed on the feeding path of the card feeding system to cause an abnormal stop, which is detected by the respective card detection sensors 16 through 18.

On the other hand, when the shutter 4 is in a normal closed state without such a trouble and no card is collected in a card collection box, such information is notified to the CPU 20 to allow to wait card transactions by next customer.

Next, a flow of coping method when abnormality occurs in a waiting state will be described with reference to the operational flow chart shown in FIG. 3.

In a waiting state (step S1), an illegal person may forcibly open the shutter 4 to thieve another person's card and set a trap in the inside of the device. In the step S4, the shutter open/close sensor 6 detects whether the shutter 4 is opened or not. Therefore, when the shutter 4 is forcibly opened in order that an illegal person sets a trap, it is detected by the shutter open/close sensor 6 (Yes).

In other words, although it is a waiting state where a card shaped medium "C" is not present in the inside of the card reader (step S2) and further, although a new card shaped medium "C" is not inserted from the card insertion port 2, that is, although there is no detection by the card detecting magnetic head 3 (step S3), when opening of the shutter 4 is detected, the detection signal is transmitted to the detection time measuring part 21 of the CPU 20. The detection time measuring part 21 starts counting an actual measuring detection time "t" based on the transmitted detection signal (step S5) and informs the actual measuring detection time "t" to the abnormality judging part 22. The abnormality judging part 22 reads out the specified detection time "T" stored in the ROM and compares it with the actual measuring detection time "t" from the shutter open/close sensor 6 to check whether the actual measuring detection time "t" exceeds the specified detection time "T" or not (step S6). When the actual measuring detection time "t" exceeds the specified detection time "T", i.e., "t">"T" (Yes), the abnormality judging part 22 judges that it is not an abnormality due to a failure of the mechanism but it is an abnormality which occurs by a fraudulent conduct and transmits an emergency activating signal to the abnormality coping part 30 (step S7).

Further, such an abnormality may be coped with as follows: when an instruction of informing the device state of the card reader at a present situation is received from the host device or when a permission of the taking-in of a card is received from the host device at the time of the occurrence of abnormality, the CPU 20 informs to the host device the situation of the occurrence of abnormality and that it can not be in a card handling situation.

In the step S8, when the abnormality coping part 30 receives an instruction from the abnormality judging part 22 of the CPU 20 through an emergency activating signal, in the case that, for example, the display part 31 is provided in the main body 1 of the card reader or its ATM device as an LCD screen, the abnormality coping part 30 displays a message on the LCD screen that an abnormality has occurred so as to inform and warn its device supervisor and the like. As a result, next card transaction by another customer using the ATM device is not executed or a fraudulent conduct by an illegal person is prohibited. In parallel with such an abnormality coping processing, the CPU 20 immediately transmits and reports the occurrence of abnormality to the host device and, for example, an emergent situation is notified through an operator in a managing center.

Alternatively, when the alarm part 32 is provided in the main body 1 of the card reader or in an ATM device as the abnormality coping part 30, an alarm buzzer is sounded to alarm the occurrence of abnormality and to call attentions to the surroundings. As a result, a trap by an illegal person may be removed to prevent a fraudulent conduct.

Further, when the shutter emergency closing part 33 is provided as the abnormality coping part 30, an emergency activating signal is transmitted to the solenoid 5 for shutter to lower the shutter 4 to obtain emergency closing. As a result, a card transaction for the next customer is temporarily stopped or a further fraudulent conduct by an illegal person is prohibited.

As described above, only one of the display part 31, the alarm part 32 and the shutter emergency closing part 33 is capable of coping with an abnormality as the abnormality coping part 30. Alternatively, the display part 31 may be combined with the alarm part 32 or all of them may be combined to further effectively prevent an illegal conduct.

Although the present invention has been shown and described with reference to specific embodiments, various changes and modifications will be apparent to those skilled in the art from the teachings herein.

For example, in an embodiment of the present invention, the existing solenoid 5 is utilized as the shutter emergency closing part 33 to urgently operated at the time of the occurrence of abnormality and the shutter 4 is closed. However, when a hard object is set as a trap, the shutter 4 may not be completely closed due to the existence of the hard trap at the time of emergency closing. In order to cope with such a case, a large-sized emergency dedicated shutter and its drive system for covering and closing the front part of the card insertion port of the card reader may be provided separately from the existing shutter 4 and the solenoid 5.

Further, another embodiment described below may be constructed. In other words, when an abnormality where a trap for a card theft is set is detected, the card feeding mechanism comprising of the feeding belt 7 and the feed rollers 10 through 12, which are normally rotated in a forward taking-in direction, may be operated in a reverse rotating direction with a control signal from the CPU 20 to eject the set trap outside from the card insertion port 2. In this case, it is effective to remove a sheet-shaped trap that is set on the feeding belt 7.

In the card taking-in permitted state where card taking-in processing can be executed without receiving an instruction from the host device as described in the above-mentioned embodiments, the further operation of the taking-in of the card can be prohibited even though a card shaped medium "C" is inserted from the card insertion port 2 when the shutter 4 is forcibly opened in an illegal manner and the occurrence of abnormality is judged. Since the card reader is set to be the above-mentioned taking-in prohibited state, the host device is capable of recognizing the situation and thus a further taking-in of the card shaped medium "C" into the inside of the card reader can be avoided even when the host device does not send an instruction prohibiting the taking-in of a card.

Further, in the above-mentioned embodiment, the present invention is applied to a magnetic card reader in which information recorded in the magnetic stripe of a card shaped medium "C" is read or written by using the magnetic head 15. However, the present invention may be applied to an IC card reader.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader comprising:
    a shutter being provided at a card feeding path for permitting taking-in of a card shaped medium inserted from a card insertion port into an inside of the card reader;
    a card detecting magnetic head being provided between the card insertion port and the shutter;
    shutter opening and closing detection means for detecting the shutter being opened; and
    control means for taking the card shaped medium into the inside of the card reader to perform a prescribed processing when the card shaped medium is normal;
    wherein, the control means further controls that, under a card insertion waiting state where the shutter has been closed and a card shaped medium has not been present in the inside of the card reader, when the shutter opening and closing detection means detects that the shutter is opened although the card detecting magnetic head does not detect insertion of the card shaped medium, the control means determines that abnormality of shutter opening without card insertion has occurred to perform abnormal coping processing.

2. The card reader according to claim 1, wherein the control means comprises:
    an abnormality judging part which compares an actual measuring detection time "t" that is measured when opening of the shutter is detected by the shutter opening and closing detection means with a specified detection time "T" which is set previously to decide the occurrence of abnormality when the actual measuring detection time "t" exceeds the specified detection time "T"; and
    an abnormality coping part for coping with the abnormality by an instruction from the abnormality judging part.

3. The card reader according to claim 1, wherein the abnormality coping part comprises at least one of a display part which displays abnormality message on a screen, an alarm part which alarms to notify the abnormality, and a shutter emergency closing part which urgently closes the shutter.

4. An abnormality coping method for a card reader comprising the steps of:
    providing a shutter for opening and closing a card feeding path for permitting taking-in of a card shaped medium inserted from a card insertion port into an inside of the card reader;
    providing a card detecting magnetic head which is provided between the card insertion port and the shutter;
    providing a shutter opening and closing detection means for detecting the shutter being opened;
    wherein in a card-insertion waiting state where the shutter has been closed and a card shaped medium has not been present in the inside of the card reader:
    detecting opening of the shutter by the shutter opening and closing detection means;
    detecting insertion of a card shaped medium from the card insertion port by the card detecting magnetic head;
    afterwards deciding occurrence of abnormality when the shutter opening and closing detection means detects that the shutter is opened although the card detecting magnetic head does not detect insertion of the card shaped medium; and
    performing abnormality coping processing.

5. The abnormality coping method for card reader according to claim 4, further comprising the steps of:
    comparing an actual measuring detection time "t" that is measured when opening of the shutter is detected by the shutter opening and closing detection means with a specified detection time "T" which is set previously;
    deciding the occurrence of abnormality when the actual measuring detection time "t" exceeds the specified detection time "T"; and
    performing at least one of the steps of displaying abnormality message on a screen of a display part, alarming the abnormality by using an alarm part, and urgently closing the shutter by using a shutter emergency closing part.

* * * * *